United States Patent
Patterson et al.

Patent Number: 5,641,759
Date of Patent: Jun. 24, 1997

[54] ANIMAL HUSBANDRY METHODS AND COMPOSITIONS THEREFOR

[75] Inventors: John A. Patterson, West Lafayette, Ind.; Geoffrey N. Richards, Missoula, Mont.

[73] Assignee: Purdue Research Foundation, Lafayette, Ind.

[21] Appl. No.: 66,276

[22] Filed: May 26, 1993

[51] Int. Cl.$^6$ .................. A01N 43/04; A01K 31/715; A23C 17/00

[52] U.S. Cl. ................ 514/53; 514/54; 514/61; 514/867; 424/439; 424/442; 426/71; 426/650; 426/658; 426/660; 426/801

[58] Field of Search ................ 514/53, 54, 61, 514/867; 424/439, 442; 426/71, 650, 658, 660, 801, 807

[56] References Cited

U.S. PATENT DOCUMENTS

| | | | |
|---|---|---|---|
| 4,622,341 | 11/1986 | Szatloczky et al. | 514/648 |
| 4,762,822 | 8/1988 | Ettinger | 514/25 |
| 4,927,811 | 5/1990 | Quarles | 514/23 |
| 4,963,384 | 10/1990 | Heine et al. | 426/580 |
| 4,994,442 | 2/1991 | Gil et al. | 514/25 |
| 5,013,569 | 5/1991 | Rubin | 426/585 |
| 5,021,245 | 6/1991 | Borschel et al. | 426/2 |
| 5,032,579 | 7/1991 | Speights et al. | 514/23 |
| 5,071,653 | 12/1991 | Kakuda et al. | 424/195.1 |
| 5,206,355 | 4/1993 | Richards et al. | 536/4.1 |
| 5,294,546 | 3/1994 | Dumbou et al. | 435/101 |

*Primary Examiner*—John Kight
*Assistant Examiner*—Louise Leary

[57] ABSTRACT

The present invention relates to a method and composition for animal husbandry comprising administering to livestock and other animals at least one composition selected from the group consisting of a caramel composition comprising a high content of fructose oligosaccharides, termed sucrose thermal oligosaccharides (STO), and a product comprising sucrose thermal kestoses. The growth of livestock and other animals may be greatly increased by administering STO caramel or sucrose thermal kestoses. The compositions alter specific microflora within the gastrointestinal tract to enhance the health of the animal by increasing the numbers of bifidobacteria and lactobacilli, and decreasing the numbers of undesirable microorganisms.

24 Claims, 4 Drawing Sheets

ANIMAL HUSBANDRY METHODS AND COMPOSITIONS THEREFOR

TECHNICAL FIELD

The present invention relates to a method and composition for animal husbandry comprising administering to livestock and other animals at least one composition selected from the group consisting of a caramel composition comprising a high content of fructose oligosaccharides, termed sucrose thermal oligosaccharides (STO), and a product comprising sucrose thermal kestoses.

BACKGROUND OF THE INVENTION

In the livestock industry, feed costs constitute the major cost of producing meat, milk or eggs for human consumption. Considerable research naturally centers around improving the efficiency of feed utilization. For example, in 1934, it required 14 weeks to produce a chicken broiler weighing 3½ pounds. (Combs, G. F. 1961. Quality and Quantity of Final Product-Poultry. Proc. Fed. Am. Soc. Explt. Biol. 20, 306–312.) Conventional methods now require approximately 7 weeks to produce a 5 lb. bird.

In addition to costs associated with feed, disease control constitutes a high priority in raising livestock. Due to the large numbers of livestock handled and the confinement of large numbers of livestock in unit pens, emphasis is directed to preventing disease at the onset rather than curing diseased animals.

Among many, coccidiosis is one of the oldest and most prevalent diseases. It affects many animals, including cattle, sheep, dogs, cats and poultry. It is characterized by a parasitic infestation of the alimentary canal by protozoans. The disease is most virulent in young chickens, and is therefore of particular importance to the broiler industry. Any animal infected with coccidiosis suffers weight loss or low weight gain and often dehydration. Thus, use of coccidiostats in livestock rations, especially poultry feed, is standard practice.

Further, livestock may be stressed by a variety of environmental factors which include large numbers of livestock being confined together, handling of livestock for inspection or inoculation, for example, transportation of the livestock between pens, elevated temperatures, etc. Typically, stressed livestock require the administration of antibiotics in order to maintain the health of the animal.

In addition to disease and stress, the control of microflora is important. Microflora comprise bacteria found predominantly on the skin of animals and in the intestinal tracts. It is commonly believed that certain components of the normal intestinal microflora influence health and control of disease. The presence of microflora influences the point at which meat, milk and eggs will begin to spoil. A large bacterial count is responsible for premature food spoiling.

Efforts to control disease caused by pathogenic microflora are expensive and sometimes ineffective, and overall add to the cost of producing meat, egg and milk products. Further, the administration of expensive antibiotics also add to the costs of raising livestock. These costs are typically absorbed by the consumer.

Caramels are confectionery products obtained by heating glucose, sucrose or other reducing sugars. The time generally required to achieve caramelization is several hours, typically from 3 to 9 hours. The composition of caramels has been studied previously and caramels prepared from sucrose have been shown to contain small amounts of oligosaccharides, predominantly glucose disaccharides.

Recently, a new type of caramel containing a high content of fructose oligosaccharides, termed sucrose thermal oligosaccharides (STO), has been prepared and is described in U.S. patent application Ser. No. 07/983,446 filed Dec. 12, 1992, now U.S. Pat. No. 07/5,318,794 which is hereby incorporated by reference in its entirety.

The sucrose thermal oligosaccharide (STO) caramel of U.S. Pat. No. 5,318,794 is prepared by milling sucrose and an organic acid in a ball mill for approximately 0.5 to 4 hours, heating to a temperature of 130°–160° C. for 0.5 to 15 minutes and cooling quickly to produce the sucrose thermal oligosaccharide (STO) caramel product. The caramel contains an unusually high content of fructose oligosaccharides.

Further, a new type of sugar composition has been prepared by the thermal reaction of amorphous sucrose in the presence of an acid catalyst at a temperature of 80 to 100° C. The product comprises a mixture of sucrose thermal kestoses. The process and final products are set forth in U.S. Pat. No. 5,206,355 issued Apr. 27, 1993, which is hereby incorporated by reference in its entirety.

According to the present invention it has been unexpectedly discovered that STO caramels prepared according to U.S. Pat. No. 5,318,794 and sucrose thermal kestoses prepared according to U.S. Pat. No. 5,206,355, modify intestinal microflora, including bifidobacteria and lactobacilli, in livestock and other animals.

Further, according to the present invention, it has been unexpectedly discovered that the growth and health of livestock and other animals may be greatly increased by administering to the livestock or other animals STO caramel or sucrose thermal kestoses.

SUMMARY OF THE INVENTION

It is accordingly an object of the present invention to provide a method of animal husbandry comprising administering to an animal a caramel product having a high content of fructose oligosaccharides, termed sucrose thermal oligosaccharides (STO), or administering sucrose thermal kestoses.

It is a further object of the present invention to provide a method for altering specific microflora within the gastrointestinal tract of livestock and other animals to enhance the health of the animal by administering STO caramel or sucrose thermal kestoses.

It is a further object of the present invention to provide a method of preparing an improved animal feed stock comprising STO caramel or a method of preparing an improved animal feed stock comprising sucrose thermal kestoses.

It is yet another object of the present invention to provide an improved animal feed stock comprising STO caramel and an improved animal feed stock comprising sucrose thermal kestoses.

Detailed Description of the Invention

Figure 1:
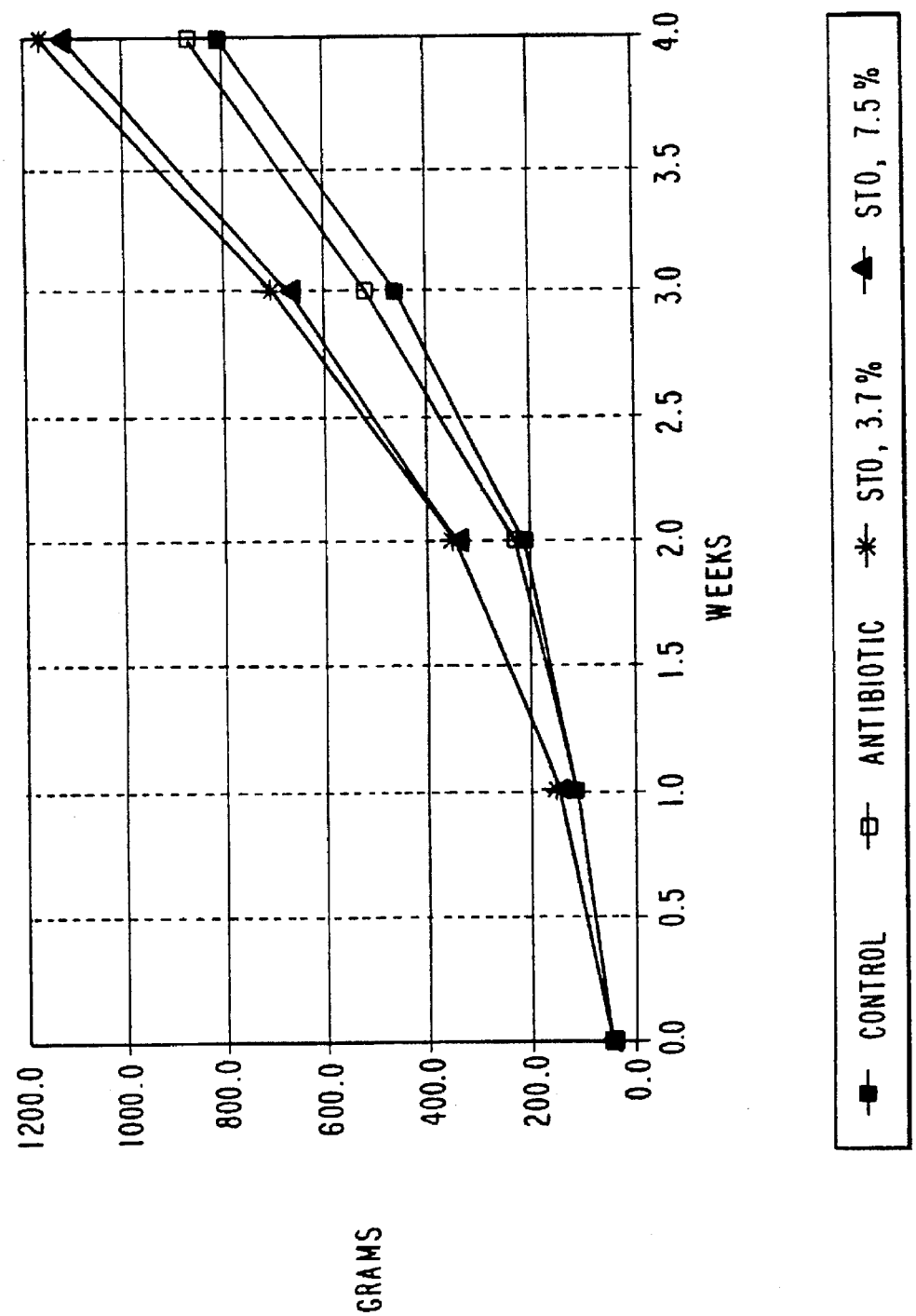
FIG. 1 is a study of the effect of STO on poultry body weight over a four week period.

According to the present invention, it has been unexpectedly found that it is possible to greatly increase animal growth rates and health by administering a caramel having a high content of fructose oligosaccharides (STO caramel), or by administering sucrose thermal kestoses.

The animal husbandry method and composition according to the present invention is used to enhance the growth rate and health of any animal, and in particular, animals which are kept as livestock to supply meat, milk or eggs. The present invention is also applicable for use on other domestic animals including horses, cats, dogs, rabbits, etc. as well as fish. In the livestock industry, feed constitutes the major cost of producing consumer products including meat, milk or eggs. The present invention represents a significant achievement in reducing the costs associated with the livestock industry.

The STO caramel is prepared according to U.S. Pat. No. 5,318,794. The process includes mixing sucrose and an organic acid in a ball mill for approximately 0.5 to 4 hours, heating to a temperature of 130°–160° C. for 0.5 to 15 minutes and cooling quickly to produce the STO caramel product.

The STO caramel contains at least about 20% fructose oligosaccharides. These fructose oligosaccharides have a DP of 3–10. Accordingly, a STO caramel comprising at least 20% fructose oligosaccharides, preferably about 20–50%, and having a DP of 3–10 may be administered.

The fructose oligosaccharides comprising the STO caramel modify intestinal microflora, and are effective in increasing the proportion of bifidobacteria and lactobacilli in the digestive tract of animals including poultry, swine, cattle, etc.

In addition, it has been discovered that sucrose thermal kestoses may be administered to livestock and other animals according to the present invention to greatly increase animal growth and improve animal health. Sucrose thermal kestoses are prepared according to U.S. Pat. No. 5,206,355. The process for producing the sucrose thermal kestoses comprises reacting amorphous sucrose with an acid catalyst at a temperature of 80° to 110° C. Amorphous sucrose is defined as sucrose which has the chemical structure of sucrose and substantially no crystalline X-ray diffraction pattern.

The chemical formula of the starting sucrose and the products produced in accordance with the process may be described by the following formula

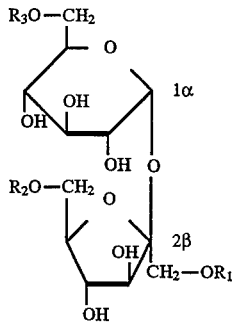

(a) Sucrose, $R_1=R_2=R_3=H$;
(b) 1-kestose, $R_1=\beta$-D-fructofuranosyl, $R_2=R_3=H$;
(c) Iso-1-kestose, $R_1=\alpha$-D-fructofuranosyl, $R_2=R_3=H$
(d) 6-kestose, $R_2=\alpha$-D-fructofuranosyl, $R_1=R_3=H$
(e) Iso-6-kestose, $R_2=\alpha$-D-fructofuranosyl, $R_1=R_3=H$
(f) Neokestose, $R_3=\beta$-D-fructofuranosyl, $R_1=R_2=H$.
(g) Iso-neokestose, $R_3=\alpha$-D-fructofuranosyl, $R_1=R_2=H$.

According to the present invention, the STO caramel or sucrose thermal kestoses are administered to the livestock. It is preferable to administer the STO caramel or sucrose thermal kestoses in the feed stock for convenience, but any other method of administration may be used. The STO caramel or sucrose thermal kestoses may be dissolved in the animal water supply or encapsulated in a sustained release system which is administered orally to the animal. Any other administration means may be used, but it is important that the STO caramel or sucrose thermal kestoses are administered orally in order to modify the specific microflora in the gastrointestinal tract of the animal in order to enhance the health of the animal.

The health of the animal is greatly improved when the STO caramel, which contains a high content of fructose oligosaccharides, or the sucrose thermal kestoses, are administered to the animal. Disease control constitutes a high priority in livestock raising. Livestock are typically raised in confinement and large numbers of livestock are grouped close together in unit pens. Accordingly, prevention of disease rather than the treatment of diseased animals is preferred.

In addition to the problems associated with disease, stress due to various environmental factors impairs animal health. Stressed animals conventionally require the addition of antibiotics in the feed stock as a preventive measure of inhibiting the onset of disease.

Animals may be stressed in a variety of ways, and typically, the environmental factors associated with the stress of livestock cannot be economically decreased in comparison to the administration of antibiotics. Livestock stress is due to various factors, the most common of which include close confinement of larger numbers of livestock in unit pens, handling of the livestock for inspection or inoculation. Transporting animals, elevated temperatures, noise, etc are also a major contributors. As previously stated, stressed livestock are typically given antibiotics in order to maintain the health of the animal.

It has been surprisingly found that according to the present invention, that animals which are not stressed and fed with STO caramels or sucrose thermal kestoses are healthier and less disease prone than animals fed with conventional diets.

It has also been unexpectedly found animals which are stressed and are fed the STO caramel or sucrose thermal kestoses are significantly healthier and less disease prone than stressed animals fed conventional diets, and are also significantly healthier and less disease prone than stressed animals fed conventional diets which include an antibiotic supplement to combat the stress.

The methods of the present invention provide particular advantages in improving poultry feed. Thus, using the methods of the invention, marketing time for broiler chickens can be reduced from seven weeks to six weeks for a five pound bird. Further, improved feed conversion in the range of from 2.0 to 1.6 can be expected. Also, advantages are achieved in improving breast weight and dressed carcass weight ratios in the range of 28.7% to 30.4%. A decrease on runts is also achieved, e.g., from 32 to 16 at seven weeks as shown herein.

Further, and in accordance with the present invention, livestock or animals to which STO caramel or sucrose thermal kestoses are administered exhibit changes in microflora within the gastrointestinal tract of the animal. Thus, the compositions according to the present invention further comprise a method of altering specific microflora within the gastrointestinal tract of an animal to enhance the health of animals by administering STO caramel or a sucrose thermal kestose.

Among the microflora known to exist in the gastrointestinal tract of animals, bifidobacteria and lactobacilli are considered to be beneficial intestinal bacteria, while others such as *E. coli* and salmonella are detrimental to animals in terms of both health and nutrition.

It has been discovered according to the present invention that animals fed a diet of STO caramel or sucrose thermal oligosaccharides exhibit increased numbers of bifidobacteria and lactobacilli. An increase in these microflora, as is known, reflects the fact that the bifidobacteria and lactobacilli utilize the fructose oligosaccharides, while most detrimental microflora do not.

Thus, in accordance with these and other objectives, the present invention is useful not only for greatly increasing the growth rate of animals, but it is also useful for altering the specific microflora within the gastrointestinal tracts of animals and to reduce the possibility of carcass contamination by pathogenic microorganisms.

It is preferred that the STO caramel or sucrose thermal kestoses be administered in the feed stock of the animal for convenience, but any other method of administration may be used. Accordingly, the present invention also relates to a method of preparing an improved animal feed stock and the prepared animal feed stock produced thereby. The STO caramel or sucrose thermal kestoses are preferably mixed with an stock in am stock in amount of 0.05 to 7.5 wt. % and more preferably about 0.5 to 4.0 wt. %.

In the alternative, a corresponding amount of the STO caramel or the sucrose thermal kestoses may be administered to the animal through its water supply or ingested in a pure form. The STO caramel or sucrose thermal kestoses may further be administered in a tablet or pill form or other delivery system in a pharmaceutical formulation. It is important that the STO caramel or sucrose thermal kestoses be administered orally to the animal so that the beneficial factors effecting the microflora of the intestinal bacteria may be achieved. Thus, any method of oral administration is within the scope of the present invention.

As an example of a method of preparing the improved animal feed stock, preferably the STO caramel or sucrose thermal kestoses are mixed within animal feed stock by the process of dissolving the STO caramel or sucrose thermal kestoses in water, neutralizing the acid, mixing the solution with feed in the desired amount, and thoroughly drying the feed. The acid present in the STO caramel or sucrose thermal kestoses is typically citric acid, and this is preferably neutralized with sodium carbonate. However, it is understood that any other neutralization agent may be used as long as the agent is non-toxic to the animal. The feed may be dried, e.g., at 55° C.

Feed stock for poultry or other animals raised for meat consumption typically comprises at least one of the following including all of the cereal grains such as corn, wheat and wheat by-products. Poultry feed generally includes a protein supplement, the protein being derived from any of the following including fish meal, meat scrap, tankage, dairy by-products, peanut meal, soybean meal, etc.

As a further example, young calves fed milk or milk replacer may have the caramel or sucrose thermal kestoses added to their diet to prevent or cure diarrhea and to improve production.

As an additional example, sheep and horses require barley, oats and wheat. The STO caramel or sucrose thermal kestoses may be administered with oats, barley and wheat in the form of a mash or other composition.

Other methods of administering the STO caramel or sucrose thermal kestoses in animal feed stock are within the skill of the ordinary artisan.

If desired, the STO caramel or sucrose thermal kestoses may be initially mixed with one or more from the group consisting of antibiotics, vitamins, flavorings and colorings, or any other additive which is desired.

With these objectives in mind, the following experiments were performed.

EXPERIMENTAL

EXAMPLE 1

A study was conducted using male chickens (*Gallus domesticus*), strain Hubbard. Day old chicks were raised for four weeks on wire cages with ad libitum access to food and water. Birds were fed a 22% crude protein starter ration throughout the study. The ration contained monensin (sold under the trademark "COBAN" by Eli Lilly and Company) as a coccidiostat at 100 g per ton. No contaminants in either the feed or the water were known or identified. Treatments consisted of: control (C), sucrose thermal kestoses added to the control ration at a level of 5%, and glucose and sucrose (GS) added to the control ration at an equivalent amount contained in sucrose thermal kestoses. Eighty four male broilers were randomly allotted to 12 pens, with each treatment being replicated four times. All pens were checked daily and observed for feed and water availability and bird health. Weekly feed consumption and bird weights were measured. At the end of week 4, all birds were killed, cecal contents were collected and selected bacterial populations were enumerated. The results of the study are shown below:

TABLE 1.1

Effect of Sucrose Thermal Kestoses on Poultry Body Weight Gain, Feed Intake and Feed Conversion.

| Parameter | Control | Kestoses | Glucose & Sucrose |
|---|---|---|---|
| Body Weight, g | 979.2 | 1031.2 | 1008.2 |
| Feed Intake, g | 1290.5 | 1445.2 | 1352.5 |
| Feed Conversion | 1.32 | 1.40 | 1.34 |

TABLE 1.2

Effect of Sucrose Thermal Kestoses on Bacterial Cell Numbers/g Cecal Wet Weight.

| Parameter | Control | Kestoses | Glucose & Sucrose |
|---|---|---|---|
| Aerobic ($\times 10^8$) | 1.70 | 9.10 | 3.24 |
| Enteric ($\times 10^7$) | 6.5 | 15.00 | 21.40 |
| Anaerobic ($\times 10^{10}$) | 4.07 | 6.03 | 3.39 |
| Clostridia ($\times 10^5$) | 19.50 | 10.00 | 9.10 |
| Lactobacilli ($\times 10^9$) | 3.60 | 26.90 | 3.40 |
| Bifidobacteria ($\times 10^9$) | 1.00 | 22.90 | 1.20 |

TABLE 1.3

Comparative Data on the Effect of Sucrose
Thermal Kestoses on Bacterial Cell Numbers/g Cecal Wet
Weight (Table 1.2).

| Parameter | Percent Change Over control | Percent Change Over Glucose & Sucrose |
|---|---|---|
| Aerobic | 435 | 181 |
| Enteric | 131 | −30 |
| Anaerobic | 48 | 78 |
| Clostridia | −48 | 9 |
| Lactobacilli | 647 | 691 |
| Bifidobacteria | 2190 | 1808 |

From the above Example 1 it can be seen that the sucrose thermal kestoses treatment was effective to modify specific microflora in the gastrointestinal tracts. There was a numerical increase in body weight and feed efficiency and a significant increase in numbers of lactobacilli and bifidobacteria with the sucrose thermal kestoses treatment.

Table 1.3 shows the percentage of increase in bacterial cell numbers, calculated by finding the difference between the bacterial cell numbers of the kestoses and the control, or the kestoses and glucose and sucrose, and dividing by the bacterial cell numbers of either the control or glucose and sucrose, respectively.

As evidenced by Table 1.3, the administration of sucrose thermal kestoses to animal feed results in a dramatic increase in lactobacilli and bifidobacteria, the percent change being 647% and 2190%, respectively, compared with the control. The percent change compared with the animal feed supplemented with sucrose and glucose remained high, 691% and 1808% respectively for the lactobacilli and bifidobacteria. The data evidences that the changes in bacterial cell counts are not merely the result of an increase in sugar intake, but are the result of administering the sucrose thermal kestoses according to the present invention.

Thus, in accordance with the present invention, it is possible to increase the bifidobacterial cell numbers in animals by at least about 100.%, preferably at least about 250%, more preferably by at least 500%, 750%, 1000%, up to about 1500%, by the administration of sucrose thermal kestoses to the animal diet.

Further in accordance with the present invention, it is possible to increase the lactobacilli cell numbers in animals by at least 50%, more preferably by 100%, 150%, 300%, up to about 550% or higher by the administration of sucrose thermal kestoses to the animal diet.

EXAMPLE 2

A second study was conducted using 384 Arbor Acres x Peterson cross male broiler chicks. Day old chicks were randomly assigned to 32 pens (eight pens per treatment) and fed a 22% crude protein starter ration containing one of the following treatments for four weeks: control (C), Antibiotic (AB, Virginiamycin at 11 g/ton), Sucrose thermal oligosaccharides (STO) caramel at 3.7% (STO3.7) and STO at 7.5% (STO7.5) of feed dry matter. The treatments were added to the feed, which was then dried. Room temperature was maintained higher than recommended to induce a mild stress. Birds were checked daily for availability of feed and water and for bird health. Light was provided 22 h per day. At the end of four weeks, all birds were killed, cecal contents were collected and selected bacterial populations were enumerated. The results of the four week study are shown below:

TABLE 2.1

Effect of STO Caramel on Poultry Body Weight,
Feed Intake and FeedConversion, Four Week Study.

| Parameter | C | AB | STO 3.7 | STO 7.5 |
|---|---|---|---|---|
| Body Weight, g | 881.5 | 961.8 | 1216.0 | 1192.3 |
| Feed Intake, g | 1542.6 | 1606.9 | 1770.8 | 1789.9 |
| Feed Conversion | 2.0 | 2.0 | 1.6 | 1.7 |

TABLE 2.2

Effect of STO Caramel on Bacterial Cell
Numbers/g Cecal Dry Matter, Four Week Study.

| Parameter | C | AB | STO 3.7 | STO 7.5 |
|---|---|---|---|---|
| Cecal Dry Matter, % | 22.8 | 23.0 | 20.5 | 18.6 |
| Aerobic ($\times 10^8$) | 26.90 | 20.42 | 10.47 | 11.75 |
| Enteric ($\times 10^8$) | 10.00 | 17.78 | 8.32 | 8.91 |
| Anaerobic ($\times 10^{10}$) | 7.94 | 5.62 | 7.59 | 7.08 |
| Clostridia ($\times 10^6$) | 1.62 | 1.15 | 1.00 | 1.38 |
| Lactobacilli ($\times 10^8$) | 14.45 | 12.59 | 4.27 | 3.72 |
| Bifidobacteria ($\times 10^6$) | 0.95 | 9.33 | 29.51 | 24.55 |

TABLE 2.3

Comparative Data on the Effect of STO Caramel
on Bacterial Cell Numbers/g Cecal Wet Weight, Four Week
Study (Table 2.2).

| Parameter | STO 3.7/C | STO 3.7/AB | STO 7.5/C | STO 7.5/AB |
|---|---|---|---|---|
| Cecal Dry Matter, % | −10 | −11 | −18 | −19 |
| Aerobic | −61 | −49 | −56 | −42 |
| Enteric | −17 | −53 | −11 | −50 |
| Anaerobic | −4 | 35 | −11 | 26 |
| Clostridia | −38 | −20 | −15 | 20 |
| Lactobacilli | −70 | −66 | −74 | −70 |
| Bifidobacteria | 3006 | 216 | 2484 | 163 |

TABLE 2.4

Effect of STO Caramel on Number of Runts,
Mortality and Leg Deformities, Four Week Study.

| Parameter | C | AB | STO 3.7 | STO 7.5 |
|---|---|---|---|---|
| Runts | 32 | 26 | 17 | 16 |
| Mortality, <4d | 0 | 1 | 0 | 1 |
| Mortality, >4d | 0 | 2 | 0 | 1 |
| Leg Deformities | 1 | 0 | 0 | 2 |

The sucrose thermal oligosaccharides (STO) caramel treatments in Example 2 were effective to modify specific microflora in the gastrointestinal tract. Both levels of STO caramel, 3.7 and 7.5 wt. %, increased body weight, improved feed conversion and increased the number of cecal bifidobacteria.

The data in Table 2.3 was calculated as in Table 1.3. The differences between the intestinal bacterial cell numbers of animals fed a diet supplemented with STO caramel and the animals fed a conventional diet (control) were calculated and divided by the bacterial cell numbers of the control. Similarly, the differences between the intestinal bacterial cell numbers of animals fed a diet supplemented with STO caramel and animals fed a diet supplemented with only antibiotic were calculated, and divided by the intestinal bacterial cell numbers of the animal control with antibiotic.

As evidenced by the data in Table 2.3, animals fed a diet of STO caramel exhibited a substantial increase in bifidobacterial cell counts. Thus, according to the present invention, it is possible to increase the bifidobacterial cell counts by at least about 5.0%, more preferably by at least 10.0%, at least 15.5%, up to at least about 25.0%.

Experiment 2 also shows that it is possible to decrease the number of runts, or visually small birds. Further, even though mortality and leg problems were low in this study, the 3.7% STO treatment reduced these problems.

EXAMPLE 3

Four Week Growth and microflora study

The birds were a Peterson x Arbor Acres cross and were fed a standard starter poultry diet containing a coccidiostat (Monensin at 100 ppm). The antibiotic treated birds received Virginiamycin (60 ppm). The STO caramel was dissolved in water containing enough sodium carbonate to neutralize the citric acid in the STO and was mixed with the feed. The feed was then dried at 55° C. Birds were in cages above a shallow pit which contained water. The pit was not flushed during the study and room temperature was maintained slightly higher than recommended to stress the birds. Differences between this study and Peterson recommended temperatures were −0.2°, 4.5°, 5.7°, 8.5° and 12.8° C. for weeks 0–4, respectively. Individual bird weights were obtained and feed intake and pen body weights were recorded weekly. Two pens/treatment were killed on day 24 and three pen/treatment were killed on days 29 and 32. Pen body weights and feed intake for week four were obtained from six pens/treatment on day 28. On a kill day pens were blocked by treatment into kill sequences replicates and each replicate group of four treatments was killed and intestinal contents processed in sequence. Intestinal contents were weighed, pooled within pen, placed in glass containers, flushed with $CO_2$ and transported to the lab on ice. Ten g of cecal contents were weighed out under $CO_2$ and blended for 1 minute with 90 ml anaerobic dilution solution (ADS). Serial dilutions were made in ADS and 0.025 ml of appropriate dilutions were plated anaerobically. A portion of the $10^{-1}$ dilution in ADS was serially diluted in aerobic dilution solution and 0.1 ml plated (larger plates were used). The results of the study are shown below.

TABLE 3.1

Effect of STO Caramel on Poultry Body Weight Gain (g), Four Week Study.

| Week | Control | Control + Antibiotic | Low STO 3.7% | High STO 7.5% |
|---|---|---|---|---|
| Week 1 | 66.4 | 67.8 | 96.2 | 98.4 |
| Week 2 | 111.0 | 127.7 | 210.4 | 202.8 |
| Week 3 | 244.6 | 277.4 | 353.1 | 323.6 |
| Week 4 | 346.9 | 356.9 | 454.4 | 451.7 |
| Cumulative 1–4 weeks | 763.5 | 822.4 | 1124.0 | 1080.0 |

Week 4 data values include data from six pens per treatment at day 28. Cumulative body weight gains include individual bird weight gains from all eight pens per treatment at slaughter on days 25, 29 and 32.

TABLE 3.2

Effect of STO Caramel on Poultry Feed Intake (g)[1], Four Week Study.

| Week | Control | Control + Antibiotic | Low STO 3.7% | High STO 7.5% |
|---|---|---|---|---|
| Week 1 | 118.9 | 117.7 | 126.8 | 131.5 |
| Week 2 | 272.4 | 283.3 | 322.2 | 340.6 |
| Week 3 | 370.7 | 406.4 | 502.7 | 497.5 |
| Week 4 | 779.2 | 801.6 | 798.3 | 816.8 |
| Cumulative 1–4 weeks | 1542.6 | 1606.9 | 1770.8 | 1789.9 |

[1]Week 4 values include data from six pens per treatment at day 28. Cumulative feed intake values include individual bird weight gains from all eight pens per treatment at slaughter on days 25, 29 and 32.

TABLE 3.3

Effect of STO Caramel on Poultry Feed Conversion (Feed/gain), Four Week Study[1].

| Week | Control | Control + Antibiotic | Low STO 3.7% | High STO 7.5% |
|---|---|---|---|---|
| Week 1 | 1.8 | 1.7 | 1.3 | 1.3 |
| Week 2 | 2.5 | 2.2 | 1.6 | 1.7 |
| Week 3 | 1.5 | 1.5 | 1.4 | 1.5 |
| Week 4 | 2.2 | 2.3 | 1.8 | 1.8 |
| Cumulative 1–4 weeks | 2.0 | 2.0 | 1.6 | 1.7 |

[1]Week 4 values include data from six pens per treatment at day 28. Cumulative feed intake values include individual bird weight gains from all eight pens per treatment at slaughter on days 25, 29 and 32.

TABLE 3.4

Effect of STO Caramel on Bacterial Cell Numbers/g Cecal Wet Weight, Four Week Study[1].

| Parameter | C | AB | STO 3.7 | STO 7.5 |
|---|---|---|---|---|
| Aerobic ($\times 10^8$) | 4.17 | 5.01 | 2.14 | 2.19 |
| Enteric ($\times 10^8$) | 3.16 | 4.79 | 1.70 | 1.62 |
| Anaerobic ($\times 10^{10}$) | 1.32 | 1.26 | 1.58 | 1.32 |
| Clostridia ($\times 10^5$) | 2.88 | 3.31 | 2.09 | 2.57 |
| Lactobacilli ($\times 10^7$) | 22.90 | 30.20 | 8.70 | 6.90 |
| Bifidobacteria ($\times 10^5$) | 5.20 | 21.90 | 60.30 | 44.70 |

[1]Cecal contents were pooled within en. Two pens/treatment were slaughtered at day 25 and three pens/treatment were slaughtered at 29 and 32.

TABLE 3.5

Comparative Data on the Effect of STO Caramel on Bacterial Cell Numbers/g Cecal Wet Weight, Four Week Study, (Table 3.4)

| Parameter | STO 3.7/C | STO 3.7/AB | STO 7.5/C | STO 7.5/AB |
|---|---|---|---|---|
| Aerobic | −49 | −57 | −47 | −56 |
| Enteric | −46 | −64 | −49 | −66 |
| Anaerobic | 20 | 25 | 0 | 5 |
| Clostridia | −27 | −37 | −11 | −22 |
| Lactobacilli | −62 | −71 | −70 | −77 |
| Bifidobacteria | 1060 | 175 | 760 | 104 |

Results of Four Week Growth and microflora study

There was a significant effect of STO on body growth characteristics. The antibiotic treated birds had numerically higher growth rates and lower feed conversion than the control birds. Both low and high STO caramel treatments were significantly (p<0.05) different than the control and antibiotic treatments.

Figure 2:
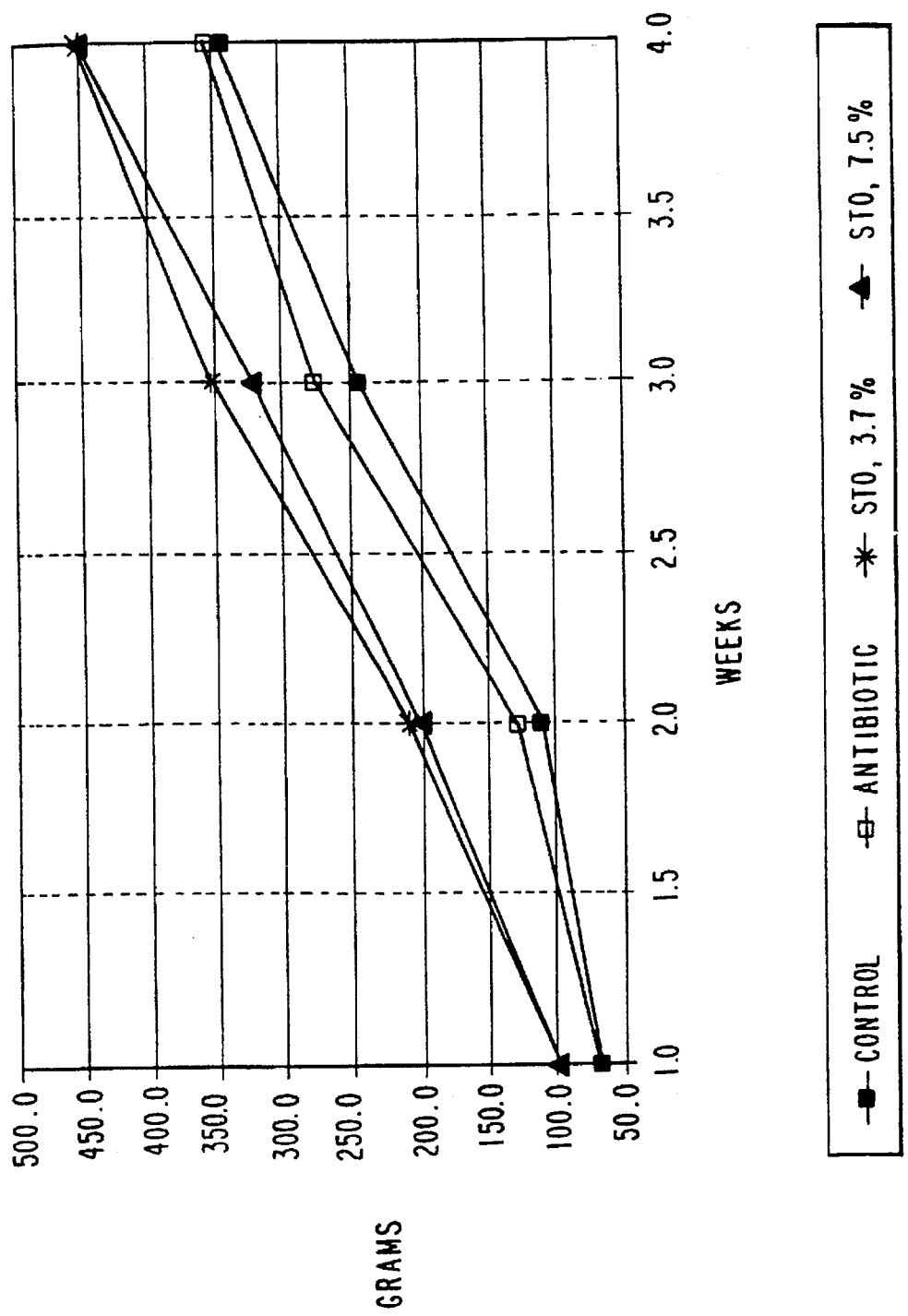
FIG. 2 is a study of the effect of STO on poultry weekly gain over a four week period.

Data from poultry body weight gain are illustrated graphically in FIG. 1. As seen in FIG. 1, poultry treated with STO caramel exhibited remarkable growth over birds fed conventional diets, and even birds fed conventional diets supplemented with antibiotics. In FIG. 2 data in the effect of STO caramel on poultry weekly gain are illustrated. As seen in FIG. 2, the poultry fed a diet of conventional feed stock supplemented with STO caramel exhibited remarkable weekly weight gain when compared to poultry fed conventional diets and even poultry fed conventional diets supplemented with antibiotics.

When numbers of bacteria/g wet cecal contents were analyzed, there were no differences between treatments in total aerobes, total anaerobes or clostridia. Numbers of enteric bacteria tended to be lower for STO treated birds. As was seen in the first study, there was an increase in numbers of bifidobacteria in the STO treated birds.

EXAMPLE 4

Seven Week Composition Study

One control pen and one high STO pen (12 birds per pen) were maintained in a third room and grown to seven weeks of age. The diet was changed from a starter to a grower diet at four weeks of age. Room temperature was maintained higher than recommended as in Example 3. Weekly pen feed intake and body weights were obtained. At seven weeks of age the birds were weighed individually and slaughtered. After defeathering and eviscerating, the feet and head were removed and hot carcass weights were recorded. The birds were placed in ice water and chilled for 4 hours. The chilled carcass weight was obtained, the neck, abdominal fat were removed and the dressed carcass weight was obtained. The breast was removed, weighed, then deboned and weighed.

TABLE 4.1

Effect of STO Caramel on Poultry Weight Gain, Feed Intake and Feed Conversion, Seven Week Study[1]

| Week | Feed, g | Gain, g | Conversion |
|---|---|---|---|
| Control | | | |
| Week 1 | 161.7 | 68.5 | 2.36 |
| Week 2 | 284.2 | 126.5 | 2.25 |
| Week 3 | 512.5 | 266.7 | 1.92 |
| Week 4 | 792.2 | 365.0 | 2.17 |
| Week 5 | 833.3 | 458.4 | 1.82 |
| Week 6 | 901.4 | 527.0 | 1.71 |
| Week 7 | 1074.7 | 489.9 | 2.19 |
| High STO | | | |
| Week 1 | 131.7 | 98.1 | 1.34 |
| Week 2 | 342.5 | 232.6 | 1.47 |
| Week 3 | 527.3 | 435.6 | 1.21 |
| Week 4 | 875.5 | 408.2 | 2.14 |
| Week 5 | 1011.8 | 464.5 | 2.18 |
| Week 6 | 999.1 | 507.9 | 1.97 |
| Week 7 | 1037.3 | 444.9 | 2.33 |

[1]Values are from one pen per treatment (12 birds/pen).

TABLE 4.2

Effect of STO Caramel on Poultry Growth, Seven Week Study [1]

| Parameters (g) | Control | High STO |
|---|---|---|
| Initial Body Wt. | 46.6 | 46.4 |
| Final Body Wt., 7 Wk. | 2349 | 2638 |
| Gain, 7 Wk. | 2302 | 2592 |

[1] Values are from one pen per treatment (12 birds per pen).

TABLE 4.3

Effect of STO Caramel on Body Composition of Seven Week Old Broilers Study [1]

| Parameters (g) | Control | High STO |
|---|---|---|
| Hot Carcass Wt., g | 1554 | 1766 |
| Chilled Carcass Wt., g | 1606 | 1812 |
| Chilled Dressed Wt., g (CDW) | 1311 | 1520 |
| Breast Wt., g | 463.2 | 557.7 |
| Boneless Breast Wt., g | 343.6 | 417.9 |
| Abdominal fat, g | 16.9 | 28.5 |
| % Breast (CDW) | 28.7 | 30.4 |
| % Boneless Breast (CDW) | 21.2 | 22.8 |

[1] Values are from one pen per treatment (12 birds per pen).

Results of Seven Week Composition Study

Bird growth was similar to the four week study. Gross morphology of the viscera did not show any increase in liver ulcers or other pathological findings. Samples taken for histological assessment showed no detectable pathological findings or abnormalities. The body composition paralleled growth differences. When assessed as a percent of dressed body weight there was a increase in whole breast weight for STO treated birds.

Table 4.1 establishes that animals fed a diet supplemented with STO caramel have improved feed conversion characteristics. The animals require less food per gram gained. Dramatically, at week 1, poultry fed a conventional diet required 161.6 grams of food for a weight gain on only 68.5 grams, while poultry fed the diet according to the present invention required only 131.7 grams of feed, but exhibited a remarkable weight gain of 98.1 grams.

Figure 3:
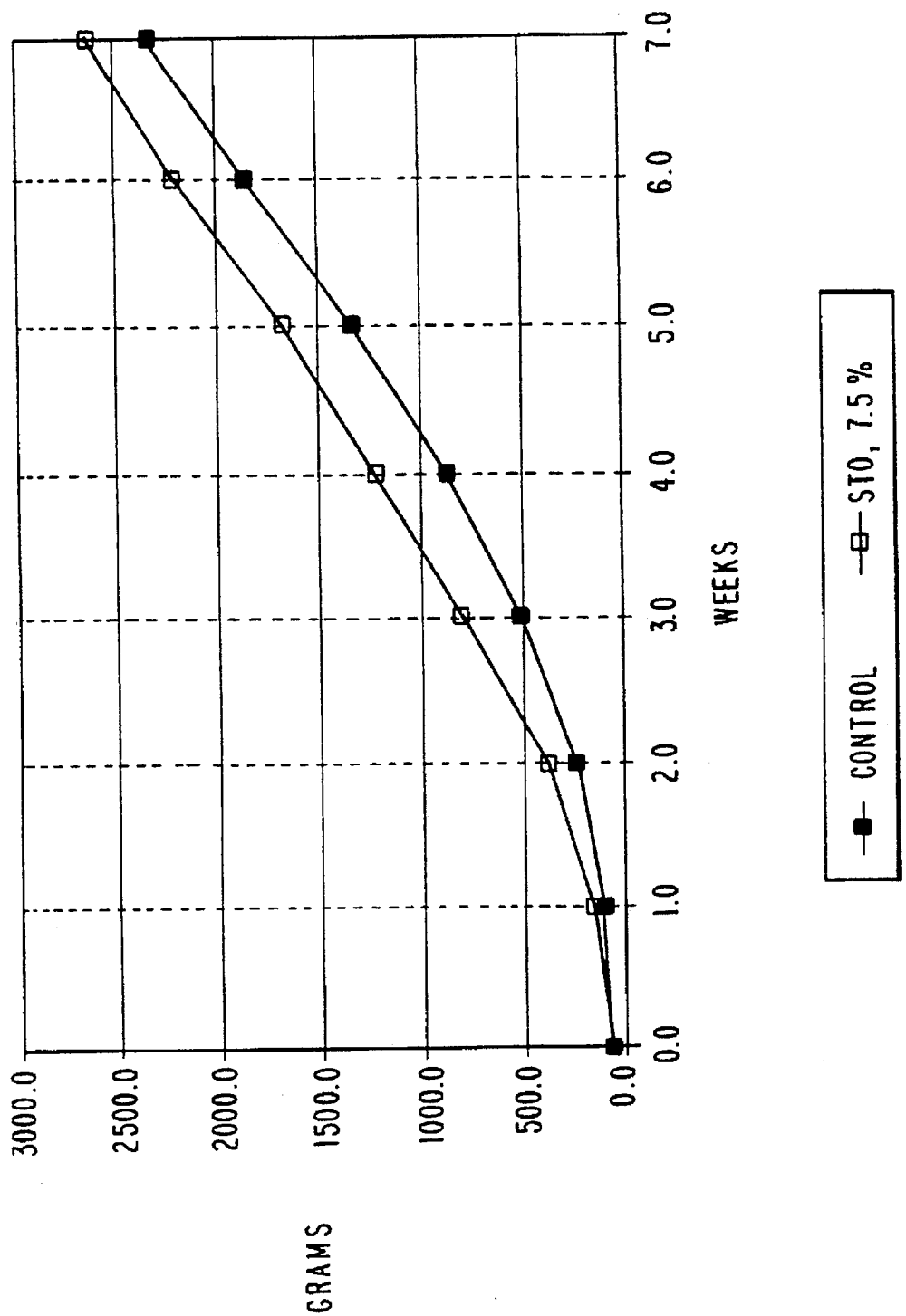
FIG. 3 is a study of the effect of STO on poultry body weight over a seven week period.
Figure 4:
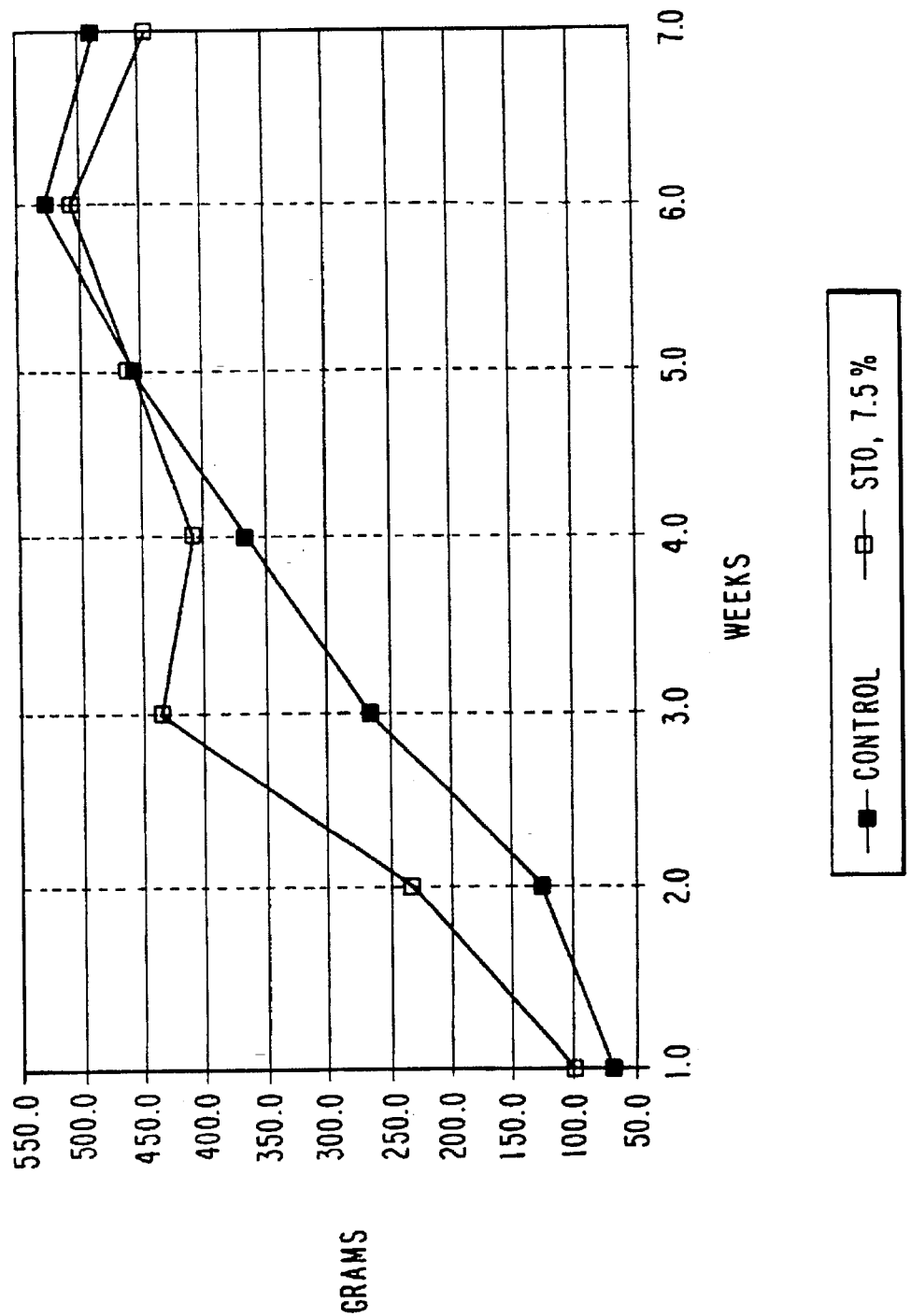
FIG. 4 is a study of the effect of STO on poultry gain over a seven week period.

As seen from FIG. 3, birds fed a diet of STO caramel over a seven week period continued to exhibit increased body weight. FIG. 4 illustrates that the poultry fed a diet supplemented with 7.5 wt. % STO continued to achieve greater weight gain much earlier than conventionally fed birds. At 3 weeks, birds fed the STO caramel supplemented diet achieved greater weight gain compared to the conventionally fed poultry.

Interpretation

This data effectively shows that STO has a positive effect on growth of poultry. Most dramatically, according to the present invention, over a time period of four weeks, it has been found that the cumulative poultry body weight gain may be increased from 763.53 grams for birds fed conventional diets to 1124.00 grams for birds feed the same diet supplemented with 3.7% of the caramel containing at least 20% high fructose oligosaccharides. See Table 3.1. Thus, the poultry according to the present invention gained an average of 361 grams more that the conventionally fed birds. Feed intake was higher for STO treated birds, however the increase in weight gain was generally greater, resulting in improved feed efficiency for the low STO at all times. The microflora data is consistent with the hypothesis that STO alters specific microflora within the gastrointestinal tract to enhance health of the animal. There was little effect on total microbial populations, but numbers of enteric bacteria decreased and bifidobacterial numbers increased in response to STO treatment. The rooms were maintained at higher than recommended temperatures to stress the birds. Thus, STO may be especially effective with environmentally or disease stressed birds, which is what would be expected given the proposed mode of action.

While various embodiments of the present invention have been described in detail, it is apparent the modifications and adaptations of these embodiments will occur to those skilled in the art. However, it is to be expressly understood that such modifications and adaptations are within the scope of the present invention, as set forth in the following claims.

We claim:

1. A method of altering specific microflora within the gastrointestinal tract of animals under stress to enhance the health of said animals, said method comprising administering to said animals an effective amount of sucrose thermal oligosaccharides (STO).

2. The method according to claim 1, wherein the quantity of bifidobacteria is increased and the quantity of enteric bacteria is decreased.

3. The method according to claim 1, wherein the quantity of said bifidobacteria is increased by at least about 100%.

4. A method of altering specific microflora within the gastrointestinal tract of animals under stress, to enhance the health of said animals, by preparing an improved animal feed stock comprising mixing animal feed stock with an effective amount of sucrose thermal oligosaccharides (STO) an administering the resulting feed stock to said animals under stress.

5. The method according to claim 4, wherein said mixing comprises dissolving said STO in water, neutralizing the acid present, mixing the solution with feed in an amount of 0.05 to 7.5 wt. %, and thoroughly drying the feed.

6. The method of preparing an improved animal feed stock according to claim 5, wherein said STO dissolved in water with the acid being neutralized are mixed with said animal feed stock in an amount of 0.5 to 4.0 wt. %.

7. The method of preparing an improved animal feed stock according to claim 4, wherein said STO comprise at least about 20 wt. % of fructose oligosaccharides.

8. The method according to claim 4, wherein said STO are mixed with said animal feed. stock in an amount of 0.05 to 7.5 wt. %.

9. The method according to claim 8, wherein said STO are mixed with said animal feed stock in an amount of about 0.5 to 4.0 wt. %.

10. A method for improving the health and growth of poultry under stress by altering specific microflora within the gastrointestinal tract of the poultry, which method comprises administering to said poultry an effective amount of sucrose thermal oligosaccharides (STO).

11. The method according to claim 10, wherein the quantity of bifidobacteria is increased and the quantity of enteric bacteria is decreased.

12. The method according to claim 11, wherein the quantity of said bifidobacteria is increased by at least about 100%.

13. A method according to claim 10, wherein the marketing period for said poultry is reduced.

14. A method according to claim 10, wherein feed conversion rates are improved.

15. A method according to claim 10, wherein breast weight and dressed carcass weight ratios are increased.

16. A method according to claim 10 wherein the occurrence of runts in the poultry flock is decreased.

17. The method according to claim 10, in which the STO are administered and produce an increase in the weight of the poultry under stress relative to poultry given an equivalent feed, with an antibiotic, but without the STO additive.

18. A method of altering specific microflora within the gastrointestinal tract of animals to enhance the health of said animals, said method comprising administering to said animals an effective amount of sucrose thermal oligosaccharides (STO) which is in the form of a caramel product.

19. The method according to claim 18 wherein the sucrose thermal oligosaccharides are prepared by pulverizing a mixture of sucrose and an organic acid for a sufficient time to form a finely pulverized mixture and to reduce the thermalization temperature of the sucrose, then heating said mixture at a temperature above the melting point of the mixture of sucrose and organic acid until the mixture melts and continuing the heating until fructose oligosaccharides form, followed by cooling the mixture and recovering a caramel which contains fructose oligosaccharides.

20. The method according to claim 19 wherein the sucrose thermal oligosaccharides (STO) are administered to the animals by mixing the STO in water, neutralizing the acid present, mixing the solution with feed in an amount of 0.05% to 7.5 wt. % and thoroughly drying the feed.

21. The method of claim 19 wherein the STO pulverizing step is carried out by milling.

22. The method of claim 21 wherein STO are prepared by:
ball-milling about 90 to 99.1 wt. % sucrose and about 0.1 to 10 wt. % citric acid for about 0.5 to 4 hours;
heating at a temperature of about 130°–160° C. for about 0.5–15; minutes with constant mixing; and
cooling rapidly to room temperature.

23. The method of claim 18 wherein the caramel product contains at least about 20% of fructose oligosaccharides.

24. The method of claim 23 wherein the caramel additionally comprises glucose, fructose and sucrose.

* * * * *

UNITED STATES PATENT AND TRADEMARK OFFICE
CERTIFICATE OF CORRECTION

PATENT NO. : 5,641,759
DATED : June 24, 1997
INVENTOR(S) : John A. PATTERSON et al.

It is certified that error appears in the above-identified patent and that said Letters Patent is hereby corrected as shown below:

On the title page, item [73] should read as follows:

--[73]   Assignees:   Purdue Research Foundation, Lafayette, Ind.; The University of Montana, Missoula, Mont.--

Signed and Sealed this

Seventh Day of April, 1998

Attest:

BRUCE LEHMAN

Attesting Officer

Commissioner of Patents and Trademarks